US008214363B2

(12) United States Patent
Chaudhary

(10) Patent No.: US 8,214,363 B2
(45) Date of Patent: Jul. 3, 2012

(54) RECOGNIZING DOMAIN SPECIFIC ENTITIES IN SEARCH QUERIES

(75) Inventor: Abhilasha Chaudhary, Charlotte, NC (US)

(73) Assignee: Abhilasha Chaudhary, Charlotte, NC (US)

( * ) Notice: Subject to any disclaimer, the term of this patent is extended or adjusted under 35 U.S.C. 154(b) by 225 days.

(21) Appl. No.: 12/829,379

(22) Filed: Jul. 1, 2010

(65) Prior Publication Data
US 2011/0004618 A1 Jan. 6, 2011

Related U.S. Application Data

(60) Provisional application No. 61/223,207, filed on Jul. 6, 2009.

(51) Int. Cl.
G06F 7/00 (2006.01)

(52) U.S. Cl. ........ 707/736; 707/737; 707/769; 707/771; 704/9; 704/10; 704/257

(58) Field of Classification Search .................. None
See application file for complete search history.

(56) References Cited

U.S. PATENT DOCUMENTS

| 5,201,047 | A | 4/1993 | Maki et al. | |
|---|---|---|---|---|
| 6,353,825 | B1 | 3/2002 | Ponte | |
| 6,513,031 | B1 | 1/2003 | Fries et al. | |
| 6,516,312 | B1 | 2/2003 | Kraft et al. | |
| 6,886,010 | B2 * | 4/2005 | Kostoff ................. | 1/1 |
| 7,225,183 | B2 * | 5/2007 | Gardner ................. | 1/1 |
| 7,542,969 | B1 | 6/2009 | Rappaport et al. | |
| 7,546,280 | B1 | 6/2009 | Ershov | |
| 7,603,348 | B2 | 10/2009 | He et al. | |
| 7,779,009 | B2 * | 8/2010 | Chowdhury et al. ......... | 707/737 |

(Continued)

OTHER PUBLICATIONS

Rennie et al., Improving Multiclass Text Classification with the Support Vector Machine, MIT Research Report, Oct. 16, 2001.
Broder et al., Robust Classification of Rare Queries Using Web Knowledge, SIGIR '07, Jul. 23-37, 2007 Amsterdam, The Netherlands.

(Continued)

Primary Examiner — Debbie Le
Assistant Examiner — Anh Tai Tran
(74) Attorney, Agent, or Firm — Williams Mullen

(57) ABSTRACT

Disclosed is a computer implemented system and method of discerning an entity class from a query. A query is received and broken into query fragments comprised of terms. The terms of the query fragments are compared to terms belonging to one or more bag of words models with matches removed. The bag of words models to which the terms removed from the query fragments belong are remembered. The remaining n terms of the query fragments are processed to obtain query phrases containing 1-n grams from the query fragments. Each query phrase is submitted to a search engine. A sampling of snippets from the search results are extracted. Non stop words from the snippets are stemmed. A similarity score is computed for the stemmed snippet words with respect to each entity class bag of words model. Snippet entity classes are selected based on the bag of words models having the highest similarity score with the stemmed snippet words. The similarity scores of the selected snippet entity classes are consolidated to obtain a candidate list of entity classes to which the query phrase belongs based on the summed similarity scores for the snippet entity classes. The entity classes that exceed a predetermined threshold are selected as the entity classes to which the query phrase belongs. The remembered bag of words models to which the terms removed from the query fragments belong are used to choose the context sensitive entity classes to which the query phrase belongs.

18 Claims, 15 Drawing Sheets

U.S. PATENT DOCUMENTS

| | | | |
|---|---|---|---|
| 2008/0040114 A1* | 2/2008 | Zhou et al. | 704/257 |
| 2008/0097982 A1 | 4/2008 | Gupta | |
| 2008/0201219 A1 | 8/2008 | Broder et al. | |
| 2008/0215557 A1 | 9/2008 | Ramer et al. | |
| 2009/0094223 A1 | 4/2009 | Berk et al. | |
| 2009/0119261 A1* | 5/2009 | Ismalon | 707/3 |

OTHER PUBLICATIONS

Chuang et al., Enriching Web Taxonomies through Subject Categorization of Query Terms from Search Engine Logs, Decision Support Systems, vol. 35, Iss. 1, Apr. 2003, pp. 113-127.

* cited by examiner

Figure 19

FOOD ENTITIES EXTRACTED FROM THE QUERY LOG

| Dessert | Fruit | Vegetable | Meat | Entree |
|---|---|---|---|---|
| fruit cake | pineapple | roma tomatoes | crab meat | dim sum |
| shell quiche | mulberry | hot peppers | squab | luau pork |
| churros | banana | thistle | chorizo | steak tartar |
| pastelitos | lychee | celery | danios | eggroll |
| meringue | smith apple | garlic | cuy | barbeque shrimp |
| mousse | berrie | asparagus | bbq ribs | salpicao |
| caramel apple pie | grape fruit | carrots | cuban pork | fish sandwich |
| kringle | rose | mung | steak | boca burger |
| bundt | lemon | artichoke | fish | tex mex |
| custard | bamboo | tomatillos | ham | focaccia |

Figure 20

PERSON ENTITIES EXTRACTED FROM THE QUERY LOG

| Sports Person | Politician | Entertainer | Spiritual Leader | Business Person |
|---|---|---|---|---|
| Ryan Moore | John Douglas | Ashley Simpson | Saint Aloysius | Jay Wolfe |
| Josh Lucas | Sabine Ulibarri | Adan Chalino | Irenaeus | Raven Davis |
| Hussein Awada | Emily Owens | Ray Price | Pual Saul | Miller Forrest |
| Ozzie Smith | Sara Nazar | Marcheline Bertand | Daniel Rona | David Drake |
| Mike Logan | Javid Iqbal | Monica Mancini | Abraham | Lawrence Gordon |

Figure 21

ELECTRONICS ENTITIES EXTRACTED FROM THE QUERY LOG

| Digital Camera | DVD Player | Cellphone | Printer | Laptop | PDA |
|---|---|---|---|---|---|
| eos 30d zum | daewoo dvg 9100n | motrola slvr l7 | lexmark z517 | armada e500 | sprint ppc 6700 |
| camedia c 2000z | pocket divx | nextel i830 | canon lbt 430 | toshiba satellite 390 | audiovox 6600 |
| nikon coolpix p4 | panasonic | blade a900 | 6122 deskjet | ibm thinkpad t23 | palm pilot 105 |
| dimage z3 | magnavox | nokia 3220b | psc 2350 | averatec 3270 | sharp tm150 |
| kodak z7590 | sony dvd player | samsung a900 | stylus 640 | powerbook g3 | samsung sph i330 |

RECOGNIZING DOMAIN SPECIFIC ENTITIES IN SEARCH QUERIES

CROSS REFERENCE TO RELATED APPLICATIONS

This application claims priority to and the benefit of U.S. Provisional Patent Application Ser. No. 61/223,207 filed Jul. 6, 2009 entitled, "Recognizing Domain Specific Entities in Search Queries".

BACKGROUND

Search queries are a rich source of information since they represent the collective wisdom of the crowds. People submit queries to search engines on a wide range of topics with the hope of finding useful information from web documents. Since most web vendors currently support keyword searches for their products, many users also submit queries to web vendors in order to find relevant products. Examples of queries include—"hashbrown potato casserole recipe", "batik beaded dress", "problem with brake on Toyota truck", "lg scoop slate", and "Gone With The Wind". These queries belong to the following broad classes—food, apparel, transportation, electronics and books—since they contain terms or groups of terms that are related to these classes, eg. 'hashbrown potato casserole' and 'recipe' are related to the food class, 'batik' and 'beaded dress' are related to the apparel class and 'brake' and 'toyota truck' are related to the transportation class.

This disclosure presents a system and method to automatically recognize in queries, terms or groups of terms that belong to a particular class. For example, the system and method presented herein can be used to recognize members of the food class such as casserole, chicken meat, and broke noodle from the queries—"cassarole potluck", "chicken meat cuts ffa skillithon" and "TGI Fridays broke noodle recipe". One of the features described herein is the ability to distinguish between fine grained classes. For example for the queries "cassoulet recipe" and "calories in cassata", our method will be able to recognize that cassoulet is a French entree and 'cassata' is an Italian dessert. Another feature described herein is the ability to recognize entities belonging to multiple classes (also called multi-class entities) as well as carryout a context sensitive recognition of multi-class entities. For example for the query "apple", the entity recognition system will recognize apple as both a fruit and a technology company. But for the queries, "apple tree" and "apple phone", the entity recognition system will carry out context sensitive recognition and recognize apple as a fruit in the first query and as a technology company in the second query.

Recognition of class specific information in search queries can benefit a large number of search engines and web vendors, since they can use this information to improve their search results, provide targeted advertising, extract domain specific information from query logs, and improve query expansion techniques.

The system described herein is termed an entity recognizer. The entity recognizer takes in a search query or a set of queries as well as list of user defined domain classes as input. The user defined classes are used to identify and tag groups of terms in queries that belong to the specified classes. For example, if the user provides a dessert class containing a list of dessert items (e.g. cake, ice cream, custard etc.) as input, the system will tag and return all the groups of terms in queries belonging to the dessert class.

There are three areas that are related to the topic of entity recognition in queries, namely (a) Named Entity Recognition, (b) Feature Selection and Document Classification, and (c) Query Classification using Web Knowledge.

Named entity taggers seek to locate and classify atomic elements in text into predefined categories so they seem to provide the capabilities of an entity recognizer. However, Named entity taggers are limited in several ways. First, current named entity taggers use syntactic, semantic, pattern-based, dictionary-based, linguistic grammar based and statistical model based techniques to recognize named entities from text. They cannot be used to recognize entities in queries, since queries do not follow the prescribed grammar of sentences (i.e., they do not have a subject and a predicate). Moreover, named entity taggers that depend on lexicons to recognize the instances of a particular class are limited by the size of the lexicon. Also, named entity taggers that use hand-crafted grammar-based systems require months of work by experienced linguists. In addition, statistical model based named entity taggers require large amounts of annotated training data to construct a model for domain specific classes.

Unlike named entity taggers, the entity recognition system and method described herein is able to recognize entities belonging to user defined classes in queries. Moreover, the system and method described herein does not require large amounts of training data from the user. For example, the user need only provide 10 seed instances for each class. As such, the system and method described herein significantly reduces the manual labor required to collect large amounts of training data.

Feature selection is a process commonly used in machine learning, wherein a subset of the features available from the data are selected for the application of a learning algorithm. This is an important stage of pre-processing and is one of the two ways of avoiding the curse of dimensionality and is very useful for classification of text documents containing a large number of features. With respect to entity recognition, careful selection of the set of features for a bag-of-words entity model is important. However, the problem addressed herein is fundamentally different from the problem addressed by feature selection for document classification.

In feature selection for document classification, a set of training documents belonging to user defined classes is carefully selected by the user. These documents contain information pertaining to the classes to which they belong. Additionally, the number of training documents provided for feature selection is usually very large. On the other hand, the input to the entity recognition system and method described herein is a set of 10 seed instances per class. Models are constructed using this limited training data that help recognize the class of unknown entities. The web is used as a surrogate to create the models. However, unlike the training documents provided in feature selection, the web documents obtained using the seed instances usually contain a lot of information that is not related to the user defined entity classes. In order to include features pertaining to the entity classes in the entity models, the information related to our entity classes from the web documents is carefully filtered out. Existing feature selection methods do not help in filtering out this information from the web documents because these methods assume that the document features are independent. In contrast, the inter-dependence between features is key to the method of model construction used in embodiments of the present invention.

Moreover, feature selection methods are used for classifying unknown documents containing a large number of features pertaining to one of the user defined classes. As such, these methods cannot be used for the recognition of unknown entities since, for performance reasons, the system and method described herein only addresses the web snippets for these unknown entities, and the web snippets contain very limited features.

Further, feature selection methods such as Branch and Bound, Decision Tree and Minimum Description Length are prohibitively data intensive for selecting features from text documents containing thousands of features, since they construct the set of discriminative features by adding or removing one feature at a time and checking if the feature set has improved based on certain criterion.

One feature selection method called Relief initially appears efficient enough to collect the set of discriminative features from text documents. However, the Relief method ultimately fails for entity recognition since it determines whether or not a feature is discriminative based on its presence or absence in a hit or miss instance. As a result the Relief method will miss out on discriminative features that are unique to an instance. For example, if an instance of the food class contains features such as "diet" and "cholesterol" that are not shared by any other instance, the Relief algorithm will not assign high scores to these features (even though they are discriminative), since they are not shared across instances of the same class. However, using the techniques described herein will enable these features to be found if they are present in well formed sentences containing high quality food features such as 'fruit'. The model of the system and method described herein needs to be rich in discriminative features due to the use of the limited features present in a few web snippets to determine the class of an unknown entity. Since Relief will miss many discriminative features, it is not a good candidate for use in entity recognition.

Another popular method of document classification uses Support Vector Machines (SVMs). In Rennie et al., it has been demonstrated that SVMs substantially outperform Naive Bayes for the task of multiclass text classification. However, SVM processing also suffers from the limitations posed by the feature selection methods in that it requires a large set of carefully selected training documents belonging to user defined classes. Such a refined training set cannot be constructed by using the web documents retrieved by our seed instances, as discussed above.

There is evidence of using the Web as a surrogate for the classification of queries as well as query terms. In Chuang et al., unknown query terms are classified into a predefined taxonomy by using the documents returned by searching the query term on the web. However, this method depends on the manual categorization of query terms in a taxonomy tree and this pre-categorized vocabulary is used to construct the set of features that help in determining the class of a new query term. In order to obtain a large set of features for each class, a large set of query terms would have to be manually categorized. Using the approach described herein however, very little training data is required to automatically find a rich set of entity class features from the web, thereby reducing the manual labor involved in collecting the set of features for each class.

Broder et al. determine the topic of a query by classifying the web search results retrieved by the query. However, their methods are not practical to the problem addressed herein for various reasons. Broder et al. uses the web documents retrieved by the entire query as opposed to individual query terms. Classifying documents using the entire query can help in determining the high level class to which a query belongs, but will not help in recognizing the low level classes for the entities in the query. Also, since they retrieve information from web documents, as opposed to web snippets, their methods are only feasible for a commercial search engine that has access to the indexed web pages that can be pre-classified and retrieved quickly so as to reduce the overhead of online query classification.

SUMMARY

Disclosed is a computer implemented system and method of discerning an entity class from a non-grammatically structured query. A query is received and broken into query fragments comprised of terms. Stop words such as, for instance, prepositions and conjunctions in the query delimit the query fragments. The terms of the query fragments are compared to terms belonging to one or more bag of words models. Terms of the query fragments that match terms belonging to one or more bag of words models are removed. The bag of words models to which the terms removed from the query fragments belong are remembered. The remaining n terms of the query fragments are processed using a sliding window approach to obtain query phrases containing 1-n grams from the query fragments. Each query phrase is submitted to a search engine and a sampling of snippets from the search results for each query phrase are extracted and stored. The non stop words from the stored snippets for each query phrase are stemmed to leave the roots of each word. A similarity score is computed for the stemmed snippet words with respect to each entity class bag of words model. Snippet entity classes are selected based on the bag of words models having the highest similarity score with the stemmed snippet words. The similarity scores of the selected snippet entity classes are consolidated to obtain a candidate list of entity classes to which the query phrase belongs based on the summed similarity scores for the snippet entity classes. The entity classes that exceed a predetermined threshold are selected as the entity classes to which the query phrase belongs. The remembered bag of words models to which the terms removed from the query fragments belong are used to choose the context sensitive entity classes to which the query phrase belongs.

The bag of words model for an entity class is created by supplying an entity class name and a plurality of instances belonging to the entity class. In one embodiment, no more than one hundred (100) instances are supplied. In another embodiment, no more than ten (10) instances are supplied. Each instance is then submitted to a search engine where a plurality of html documents from the search results for each instance are extracted and stored. In one embodiment, no more than one hundred (100) html documents are extracted and stored. In another embodiment, no more than ten (10) html documents are extracted and stored.

Each html document is converted to a text document and well formed sentences from the text documents are extracted and stored. The non stop words in the well formed sentences are stemmed. An entity network is constructed for the entity class comprised of the entity class name, the original plurality of instances and the stemmed non stop words obtained from the well formed sentences containing words in the entity network. A likelihood score is assigned to each word in the entity network based on the frequency with which that word appeared in the well formed sentences. The bag of words model for the entity class is then created using the words in the entity network along with their respective likelihood scores. The bag of words model for the entity class is refined by (i) reducing likelihood scores of words shared by bag of words models of various entity classes and (ii) removing proper nouns from the models. For instance, the likelihood score of a word shared by bag of words models of various entity classes can be divided by the number of bag of words models in which it appears. Thus, if the word "plane" appeared in three bag of words models, its likelihood score would be reduced to ⅓ of its full value.

BRIEF DESCRIPTION OF THE DRAWINGS

FIGS. 19, 20 and 21 illustrate some of the fine-grained entities extracted from the query log by the entity recognizer for the food, person and electronics classes.

DETAILED DESCRIPTION OF PREFERRED EMBODIMENTS

This disclosure focuses on the analysis of queries which contain groups of keywords that define something meaningful and significant, but unlike sentences, they do not conform to a prescribed grammar. Structurally, queries are comprised of three components: entities, features and connectives.

Entities represent instances of an entity class that are comprised of objects that have a real and independent existence. For example "city" represents an entity class and Chicago and San Francisco are instances of the entity class.

Features are words or phrases that help define an entity class or help distinguish one entity class from another. For example, a camera entity class has features such as review, catalog, price and precision.

Connectives mostly comprise prepositions, conjunctions and other stop words. Their main role is to connect entities and features in queries.

Many search queries include entities. For example, the query "The Art of The Incredibles by Mark Cotta Vaz" includes two entities, "The Art of The Incredibles" which is a cartoon drawing book and "Mark Cotta Vaz" who is a book author. The techniques described herein categorize the entities in queries into entity classes. An important observation is that many entities belong to multiple entity classes. Such entities are denoted as multi-class entities. The present techniques have been developed keeping this in mind and are able to recognize all the classes to which a multi-class entity belongs as well as carry out a context sensitive recognition of multi-class entities.

The entity recognizer described herein uses a supervised learning approach to identify entities related to user defined entity classes. The domain specific entity classes selected by the user are defined by providing a relatively small set of instances that belong to the entity classes. Currently, a set of 10 representative seed instances are pre-determined for each entity class. Also, the user further provides a meaningful name for each entity class that should represent the seed instances defined for the entity class.

Figure 1:
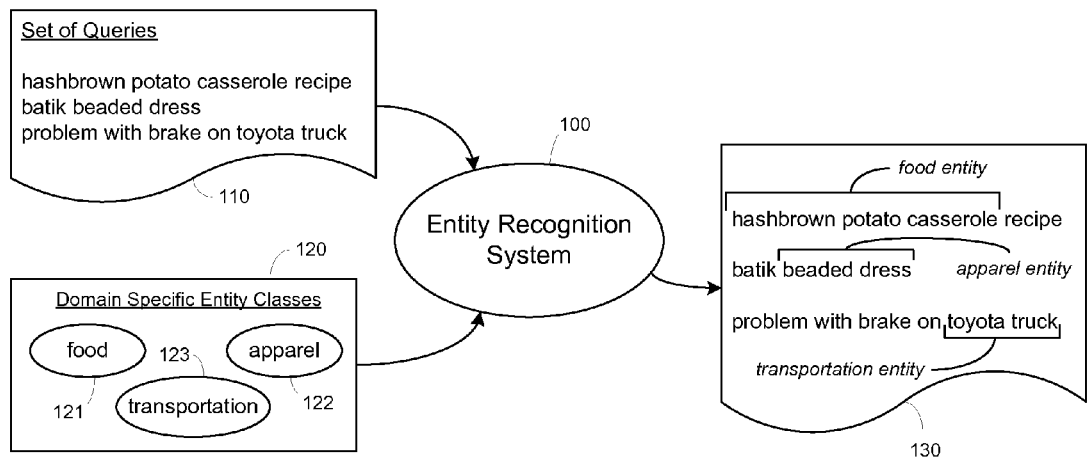
FIG. 1 is a block diagram illustrating inputs and outputs to and from the entity recognition system.

FIG. 1 shows the inputs and output to and from the entity recognition system 100. As an example on the input side, a set of queries 110 and a set of domain specific entity classes 120 are fed to the entity recognition system 100. On the output side of this example, the entity recognition system 100 recognizes hashbrown potato casserole as a food entity 121, beaded dress as an apparel entity 122 and toyota truck as a transportation entity 123.

Figure 2:
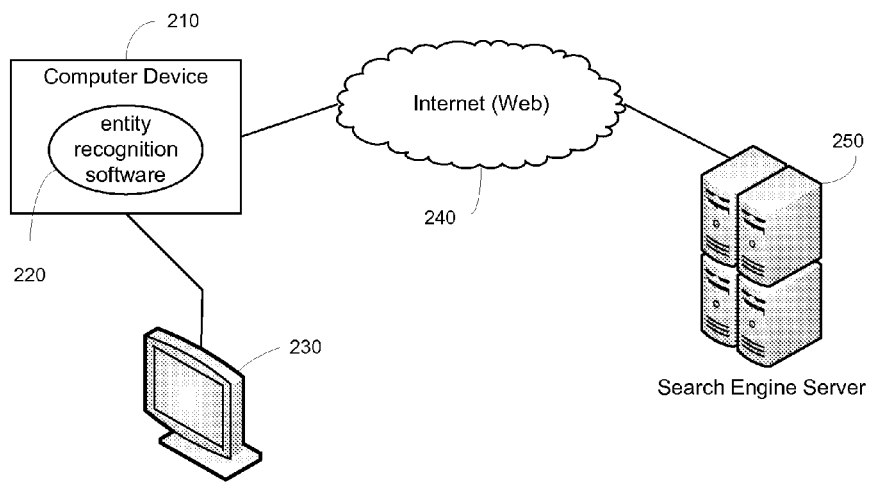
FIG. 2 is a block diagram illustrating components of hardware and software in which the invention may be practiced.

FIG. 2 is a block diagram illustrating components of hardware and software in which the invention may be practiced. Entity recognition software 220 can be executed on a computer device 210 that is connected to the Internet 240 such that the entity recognition software 220 has access to the web via a network connection that may be wired or wireless within the computer device 210. By extension, the computer device 210 and entity recognition software 220 can access and utilize one or more commercial or private search engines 250 to assist in gathering data to be processed by the entity recognition software 220. A display 230 (and other user interface peripherals—not shown) connected to or integrated into the computer device can be used to show results to a user.

Figure 3:
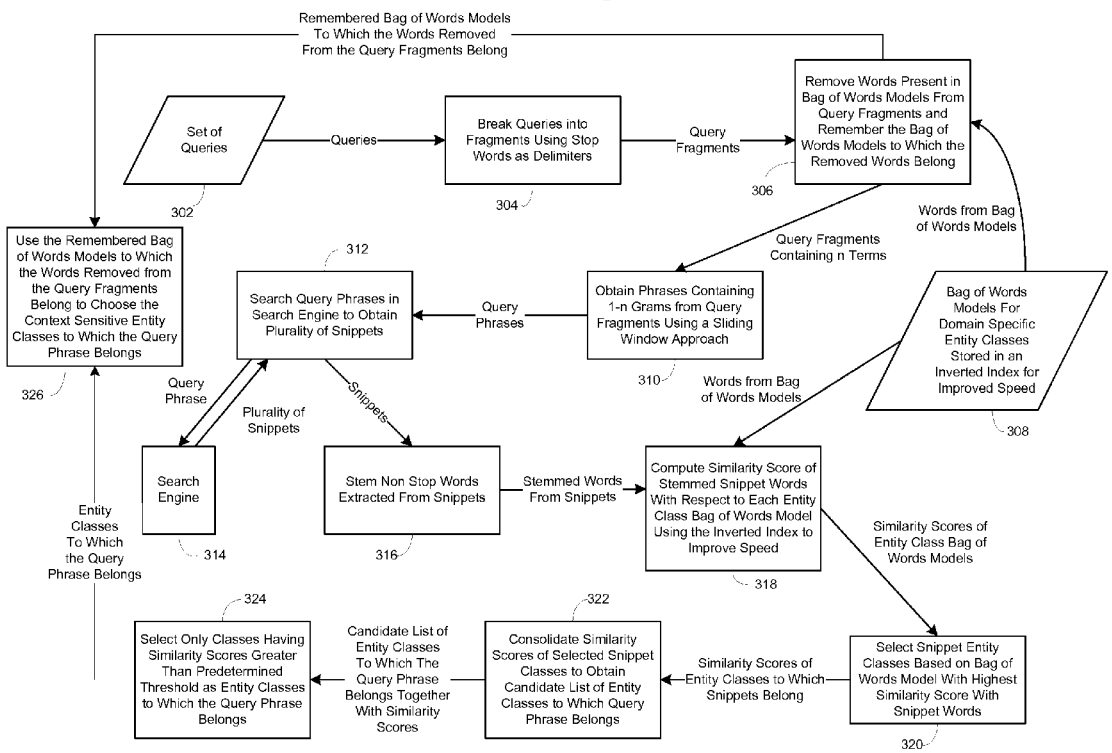
FIG. 3 is a flowchart describing the process of determining entity classes based on query phrases.

FIG. 3 is a flowchart describing the process of determining entity classes based on query phrases. A query (or set of queries) 302 is broken into fragments 304 using stop words as delimiters between the fragments. Stop words are generally parts of speech such as propositions and conjunctions. The query fragments are compared 306 to words from bag of words models stored in an inverted index for improved speed 308 and matching words are removed from the fragments. The bag of words models to which the terms removed from the query fragments belong are remembered. The creation of the bag of words model is described further with reference to FIG. 4 below. The remaining n terms of the query fragment(s) are processed using a sliding window approach to obtain query phrases 310 containing 1-n grams from the fragments. An n-gram is a subsequence of n items from a given sequence. Each phrase is treated as a potential entity. The query phrases are input to a search engine 314 to obtain a plurality of snippets 312 of web documents which are extracted and stored. The bag of words model for an entity class is created by supplying an entity class name and a plurality of instances belonging to the entity class.

In one embodiment, no more than one hundred (100) snippets are extracted and stored. In another embodiment, no more than ten (10) snippets are extracted and stored.

All non stop word terms are extracted from the snippets and stemmed 316. Stemming generally refers to the process of reducing words to their stem, base or root form. A similarity score of the stemmed snippet words is computed with respect to each entity class bag of words model using the inverted index to improve speed 318. A snippet entity class is selected based on the bag of words model having the highest similarity score with the stemmed snippet words 320. The similarity scores of selected snippet classes are consolidated to obtain a candidate list of entity classes to which a query phrase belongs 322. The list of entity classes to which the query phrase belongs is sorted according to their respective similarity scores such that only entity classes exceeding a predetermined threshold are selected as entity classes to which the query phrase belongs 324. The remembered bag of words models to which the terms removed from the query fragments belong 306 are used to choose the context sensitive entity classes to which the query phrase belongs 326.

Figure 4:
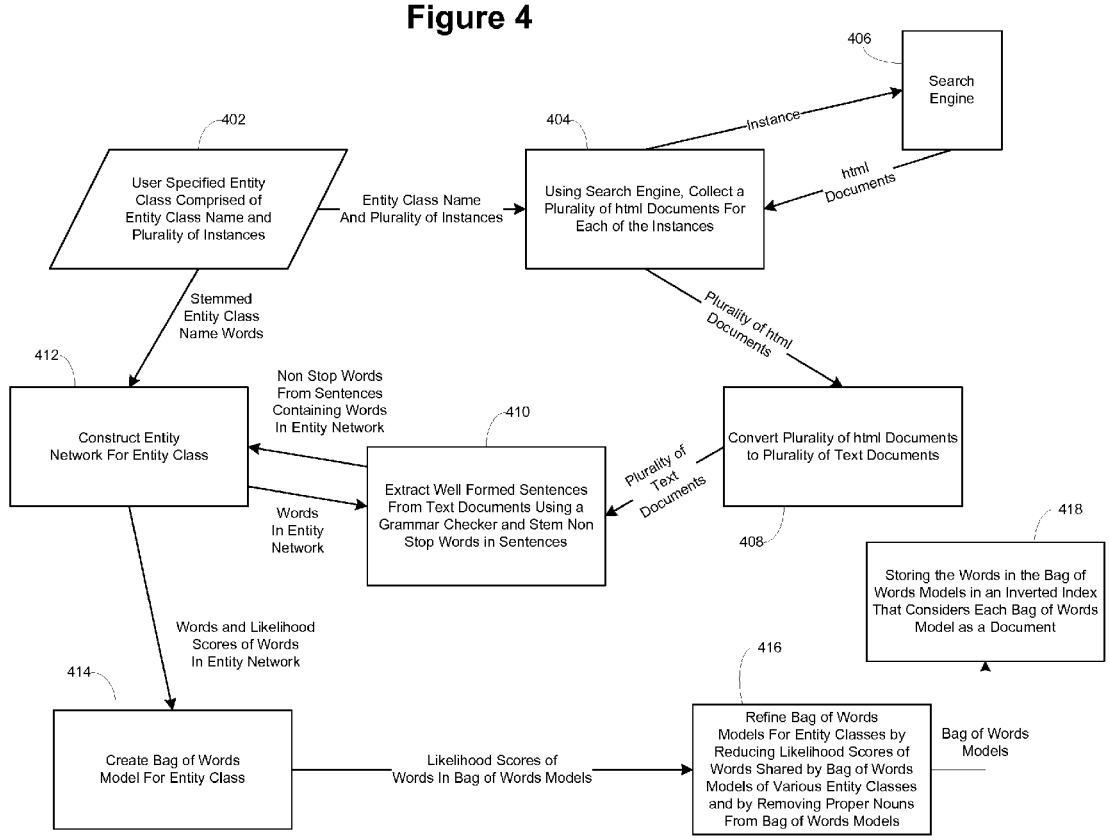
FIG. 4 is a flowchart describing the process of creating a bag of words model for an entity class.

FIG. 4 is a flowchart describing the process of creating a bag of words model for an entity class. The user specifies an entity class comprised of a class name and a plurality of instances 402. In one embodiment, no more than one hundred (100) instances are supplied. In another embodiment, no more than ten (10) instances are supplied. Each instance is then submitted to a search engine where a plurality of html documents from the search results for each instance are extracted and stored. In one embodiment, no more than one hundred (100) html documents are extracted and stored. In another embodiment, no more than ten (10) html documents are extracted and stored.

The resulting html documents are converted to corresponding text documents 408. Well formed sentences are extracted from the text documents using a grammar checker 410. In addition, all non stop words are stemmed in the sentences 410. An entity network for the entity class is constructed using the stemmed non stop words contained in the sentences as well as the words in the stemmed entity class names 412. The entity network is created from the terms that have been discovered due to their occurrence in sentences belonging to the set of well formed sentences. New terms for the entity network are discovered by extracting sentences containing one or more terms in the entity network from the set of well formed sentences. From these sentences the terms that are not stop words and are not elements of the entity network are extracted. These terms are included in the entity network and are in turn used to discover new terms that co-occur with terms in sentences belonging to the set of well formed sentences. The entity network is iteratively expanded in this manner until no new terms are discovered. After the entity network is created, the terms in the network are assigned likelihood scores which equal the frequency of the term in the set of well formed sentences. The words in the entity network along with the likelihood scores are added to the bag-of-words model for the entity class 414. The likelihood scores represent the likelihood that the word is feature of the entity network, since the words that occur frequently in web documents for the entity class are more likely to help in defining the entity class and are more likely to help in distinguishing the entity class from other classes. The bag of words model is refined 416 by reducing likelihood scores of words shared by bag of words models of various entity classes and by removing proper nouns from the models. The words in the bag of words models are stored into an inverted index 418 that considers each bag of words model as a document.

Requirements from the Entity Recognizer

Recognizing new entities quickly supports both the online analysis of search queries and the offline analysis of query logs. The entity recognizer can recognize entities belonging to any user defined class. In other words, the entity recognizer can recognize entities belonging to both high level classes such as electronics and to low level, fine grained classes such as HDTV. Recognition of fine grained entities in queries can provide valuable insights into the preferences of the online community and help improve their search experience.

Unlike other methods of supervised classification, the method described herein executes with very limited training data. Limiting training data has at least three advantages: (a) less manual labor involved in collecting training data; (b) quicker specification of user defined classes; and (c) less chance of human error due to specification of incorrect training data.

The entity recognition system applies a supervised learning approach that uses the web to create bag-of-words models for user defined entity classes. These bag-of-words models contain class specific features that are used to recognize new entities.

In order to distinguish one entity class from another, a set of features is collected that define each entity class. Ideally, the bag-of-words model will either contain only features for the entity class, or high scores for words that qualify as features of the entity class. The model is described herein as a bag-of-words model since it is represented as an unordered collection of features. To collect these features accurately, a set of documents that can provide reliable information pertaining to the entity classes is needed. The World Wide Web (web) is used as a source for collecting these documents.

The web is a huge data repository containing information about all kinds of entities. Moreover the documents returned by web search engines are sorted in order of relevance. Hence, the top documents returned from the web using the seed instances for each entity class provide a reliable source for extracting features related to the class. These features in turn can be used to build the bag-of-words models for the user defined entity classes. Moreover, since the user defined entity classes will be used to extract entities from queries, it is expected that the seed instances for these entity classes will have a substantial presence on the web.

Methods for Creating Bag-of-Words Models

In the present method, the bag-of-words model for an entity class comprises words along with scores that represent the likelihood that the word is a feature for the entity class. This method builds an entity network to collect words for the bag-of-words model.

So as to include only potential features in a model, a means to identify potential features from web pages that belong to the entity class is needed. All the words in the web pages cannot be considered as potential features since a web page usually contains lot of information that is completely unrelated to the entity class. For example, a web page related to the food entity "pizza" can contain information that provides directions to a restaurant that serves pizza. Such information can contain words such as "map", "address", "route" etc. . . . that are not features of the food entity class and should be filtered out.

Well formed sentences contain words that express a complete thought and are bound together. Looking for word co-occurrences in sentences helps create the entity model. More specifically, the entity recognition system described herein looks for sentences containing words belonging to the entity model with the expectation that other words in the sentences will be syntactically connected to these words and will also belong to the entity model. The entity recognition system does not look for word co-occurrences in paragraphs and documents even though strong paragraphs and documents contain a sentence or sentences unified around one central, controlling idea. This is because the entity recognition system can not be sure that the main idea of the paragraph or document is related to the entity class. Also, unlike grammar checkers that can be used to determine the completeness of sentences, there is no software that can be used to check whether or not paragraphs or documents are based on one central controlling idea.

Figure 5:
FIG. 5 illustrates an example of an html page containing well formed sentences, non sentence text, images, menus and buttons.

An example of an html page containing well formed sentences, non sentence text, images, menus and buttons can be seen in FIG. 5. The webpage in FIG. 5 was collected when creating the model for the food class and clearly shows that the sentences in the web page contain words such as "catering", "restaurants", "picnic" and "barbecue" that are features of the entity class food whereas the non sentence information on the web page contains words such as "Location", "Events" and "Contact Us" etc. . . . that are not features of the entity class.

To construct the bag-of-words model for the entity classes, a set of approximately 100 documents for an entity class is collected by searching each of the ten (10) seed instances of the entity class on the web and obtaining the html pages corresponding to the top 10 hits for each seed instance. These html pages are then converted into text. The well formed sentences are extracted from the text documents using a grammar checker.

The set of well formed sentences extracted from the 100 web documents for the entity class is denoted WS. Initially, the model only consists of words in the class name for the entity class. Let BM denote the bag-of-words model for an entity class. Also, let $H_x$ be the hypothesis that the term x belongs to the bag-of-words model for the entity class. Also, let $D_x$ denote the event that the term x co-occurs with a term in BM in a sentence belonging to WS. Experiments with entity classes show that a term x that does not satisfy $H_x$ does not satisfy $D_x$.

$$\neg H_x \rightarrow \neg D_x \Rightarrow D_x \rightarrow H_x$$

This shows that all terms x that satisfy $D_x$ also satisfy H. The results of these experiments show us that new terms can be obtained for the bag-of-words model using the co-occurrence of the new terms with existing BM terms in sentences in WS.

An entity network is constructed to add words to the bag-of-words model of the entity class. The entity network represents how existing terms in BM are used to select new terms to be included in the bag-of-words model for the entity class.

Figure 6:
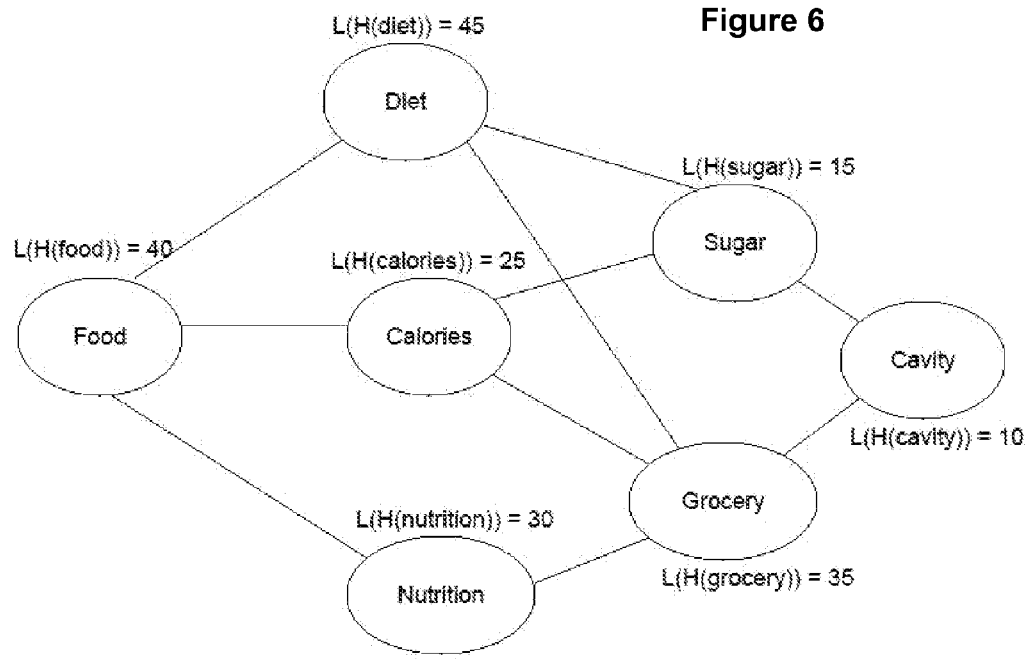
FIG. 6 illustrates an example of an entity network for the food class created using a first method.

An example of an entity network for the food class created using a first method has been provided in FIG. 6. In the entity network, an edge is drawn from the terms that have already been discovered and incorporated in BM to a new term that is discovered due to co-occurrence of the new term with terms in BM in sentences belonging to WS. For example, the terms "sugar", "diet" and "calories" are incorporated in the network since they co-occur with food in sentences belonging to WS. New words for BM are discovered by extracting sentences from WS that contain one or more words in BM. From these sentences the terms that are not stop words and are not elements of BM are extracted. These terms are included in the entity network and are in turn used to discover new terms that co-occur with these terms in sentences belonging to WS. The entity network is iteratively expanded in this manner until no new terms are discovered. After the Entity Network is created, the words in the network are assigned scores which equal the frequency of the word in WS. The words in the entity network along with the frequency scores are added to the bag-of-words model for the entity class. The frequency scores represent the likelihood that the word is a feature of the entity network, since the words that occur frequently in web documents for the entity class are more likely to help in defining the entity class and are more likely to help in distinguishing the entity class from other classes.

Figure 7:
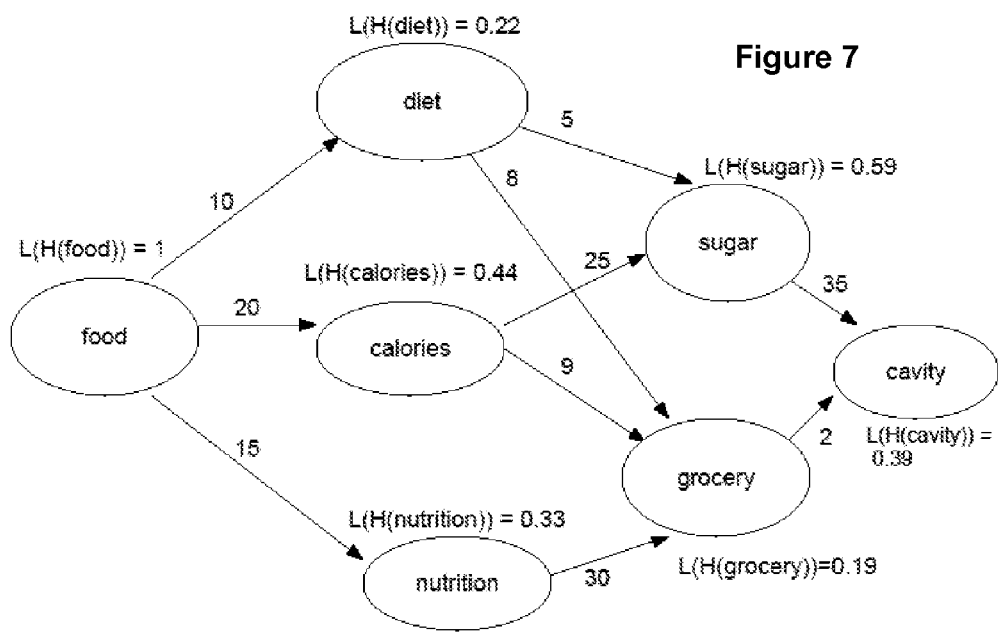
FIG. 7 illustrates an example of an entity network for the food class created using a second method.

An example of an entity network for the food class created using a second method has been provided in FIG. 7. In this entity network, an arrow is drawn from the terms that have already been discovered and incorporated in BM to a new term that is discovered due to co-occurrence of the new term with terms in BM. The terms from which arrows are drawn to new terms are called parents of the new term. For example, the term "sugar" has "diet" and "calories" as its parents. Also, the numbers on the arrows are the number of sentences in WS in which the new term co-occurs with its parent. For example there are 30 sentences in WS containing both the terms "grocery" and "nutrition". In FIG. 7, the bag-of-words model for the food class is initialized with just its class name (i.e., "food"). The likelihood that the words in the class name belong to the food entity class is 1 (i.e., $L(H_x)=1$ for "food" (where $L(H_x)$ represents the likelihood that $H_x$ is true)). The likelihood that the other features belong to the entity class is calculated via likelihood propagation across the entity network. Let y denote the features that do not belong to the initial set of high quality features for the food class and P denote the set of parents of y. Also for an element p in P, let $C_p$ denote the total number of sentences in which p is present and $C_{py}$ denote the total number of sentences in which p and y co-occur. The likelihood that $H_y$ is true $L(H_y)$ is calculated using the formula:

$$L(Hy) = \sum_{p \in P} ((L(Hp)/Cp) * (Cpy))/(|P|)$$

New features for BM are iteratively discovered by extracting the sentences from WS that contain one or more features in BM. From these sentences we extract the terms that are not stop words and are not part of BM. These terms are included as features in the network for the entity class and the likelihood of these features belonging to the bag-of-words model is calculated using the formula above.

Refining the Bag-of-Words Model

The bag-of-words model can be further refined for each entity class by reducing the weight of the features that are shared by the bag-of-words models of the entity classes. The rationale behind this is that the features shared by the entity classes are not helpful in distinguishing between the entity classes. For example, the models for the health and apparel classes could share common features like "care", "cold" and "protection" which are not discriminative enough to distinguish between the two classes. The bag-of-words models are further refined by removing proper nouns from the models by comparing the words in the model to the words in an English thesaurus. Proper nouns are not distinguishing features for an entity class.

Storing the Bag-of-Words Model in an Inverted Index

An inverted index is then constructed using the terms in our bag-of-words models. The bag-of-words model for each entity class is considered to be a document and the terms in the bag-of-words models are stored in the inverted index so that a list of models to which a term belongs along with the score of the term in each model can be quickly obtained. This greatly helps in improving the speed of entity recognition in queries.

Recognizing Entities in Queries

The bag-of-words models for user defined classes are used to recognize entities in queries. Each query that is provided to the entity recognizer is first broken into fragments by using stopwords as delimiters. It is then determined if any of the terms in the fragments belong to one or more bag-of-words models. The terms that belong to the bag-of-words models are removed from query fragments, since these terms are features and cannot be part of an entity. The models to which these terms belong also help determine the context of the query in case of multi-class entities. For example, for the query apple tray it might be determined that "tray" is present in the bag-of-words model for the food class. Tray can be eliminated from the query and the system can proceed with entity recognition for just apple. Even if the entity recognizer recognizes two entity classes for apple (i.e "fruit" and "technology company") it can determine that since tray is a feature of the food class, in the context of the query "apple tray", apple is a fruit and not a technology company.

After the preprocessing steps, each query fragment contains a sequence of terms and each subsequence of terms in a fragment is a potential entity. We use the term "phrase" to denote a subsequence of terms in a query fragment. The entity recognition system takes in fragments containing n terms as input and uses a sliding window approach to obtain the phrases containing 1-n grams from the fragments in which an n-gram is a subsequence of n items from a given sequence. Each phrase is treated as a potential entity and the class of the entity is recognized by using the bag-of-words models for the user defined classes.

Each phrase from a fragment is searched on the web and snippets of the top 10 resulting web documents are extracted and stored. Only snippets from top 10 web documents are used rather than reading the corresponding documents, since these snippets can be obtained directly from the search engine results and contain concise information pertaining to the phrase. Moreover, the top 10 snippets are most relevant to the phrase and contain enough features that can be used to identify the entity class to which the phrase belongs.

The bag-of-words model for entity classes is used to determine the class to which each snippet belongs. The process of determining the class of each snippet includes the following steps:

Extract all the non-stopword terms from the snippet.
Stem the non-stopword terms. These terms are called the snippet features and are considered to belong to the model for the snippet.
Compute the similarity score of the snippet with respect to each entity class model.

The similarity score of the model of the snippet and the model of the corresponding entity class is computed by summing the product of the weights of the features shared by the two models. The frequencies of the features in a snippet are used as the weights of the features in the model for the snippet. Let $M_c$ be the model of an entity class, $M_s$ be the model of the snippet. Also let T represent the set of terms that are shared between $M_c$ and $M_s$ (i.e., T={t|t∈$M_c$ & t∈$M_s$}). Let $W_c t_i$ and $W_s t_i$ be weight of term $t_i$ in $M_c$ and $M_s$ respectively. The similarity score between $M_c$ and $M_s$ is given by:

$$Sim\{M_c, M_s\} = \sum_{i=1}^{|T|} W_c t_i W_s t_i$$

The inverted index is used for bag-of-words models to quickly determine the features shared by the snippet and entity models along with the scores of the features in the models. This greatly speeds the process of entity recognition since we avoid the extra time incurred due to file I/O.

The entity class whose model has the highest similarity score with the model of the snippet is chosen as the entity class for the snippet. The similarity score of the model of the snippet with the model of the entity class to which it belongs is the confidence measurement for the fact that the snippet belongs to the entity class. The entity classes to which the snippets belong are also the entity classes to which the query phrase belongs. The similarity score of the query phrase with respect to an entity class is the sum of the similarity scores of the snippets that belong to that entity class. The entity classes to which the query phrase belongs are sorted based on the similarity score of the query phrase with respect to each entity class. The users of the entity recognition system can then select only the top entity classes for each query phrase.

Recognizing Null Class Phrases in Queries

The entity class for many query phrases is the null class since many phrases do not belong to one of the user defined entity classes. It is expected that the similarity scores of these phrases will be less than the similarity scores of real entities with their corresponding entity classes.

A threshold based approach is used to determine if a query phrase belongs to the null class. The threshold for the null class is computed by an automatic learning algorithm that takes as input the user defined seed entities and for each entity the similarity score with its corresponding entity class is determined via the entity recognition system. Using this method, the lowest similarity score for each entity class is obtained. This similarity score is used as a threshold to determine if a query phrase belongs to the null class in which all query phrases having similarity scores lower than the threshold defined for their entity class are identified as belonging to the null class.

Experimental Results

The experimental evaluation of the techniques described herein include a comparison of the accuracy of the entity recognizer with other related methods as well as an analysis of the entities extracted by the entity recognizer from a real world query log.

Comparison with Related Methods

A comparison of the accuracy of the entity recognizer was conducted with two related methods, namely, Feature Selection using Relief and Classification using Multiclass SVM. The entities used in this comparison belonged to the following five (5) classes from the food domain: fruit, vegetable, meat, dessert and entree.

The Relief Feature selection method was used for entity recognition in the following way. First, a set of 100 documents was collected for each entity class by searching the 10 seed instances for the entity class on the web and selecting the top 10 documents from the web search results. The documents collected for all entity classes formed the training set for the Relief Algorithm. The non stop-word terms in the documents were used as features on which the algorithm was applied to obtain a set of discriminative features for each entity class. These discriminative features formed the bag-of-words model for each entity class. An unknown entity was recognized by retrieving the top 10 snippets from searching the entity on the web and finding the bag-of-words model with which the features in the snippets had maximum overlap.

The Multiclass SVM classification method was used for entity recognition in the following way. First, a set of 100 documents was collected for each entity class by searching the 10 seed instances for the entity class on the web and selecting the top 10 documents from the web search results. Since the SVM classification improves in the presence of a null class, a null class was defined using terms that were not related to the food domain. The documents collected for all entity classes formed the training set for the SVM classifier. The non stop-word terms in the documents were used as features to create the training data for each document. The value of the features was computed by the taking the product of term frequency and the inverse document frequency for each feature. The document frequency for each feature was obtained by using a large segment of the web as the document collection and retrieving the number of the documents in which the feature was present. An unknown entity was recognized by retrieving the top 10 snippets from searching the entity on the web and constructing the test data using the terms in the snippets as features and computing the value of the features by taking the product of term frequency and the inverse document frequency for each feature. The SVM classifier was used to determine the class of the unknown entity based on the provided training and testing data.

Figure 8:
FIG. 8 compares the accuracy of the present Entity Recognizer to Feature Selection using Relief and Classification using Multiclass SVM, using subsets of 2 to 5 food entity classes.
Figure 9:
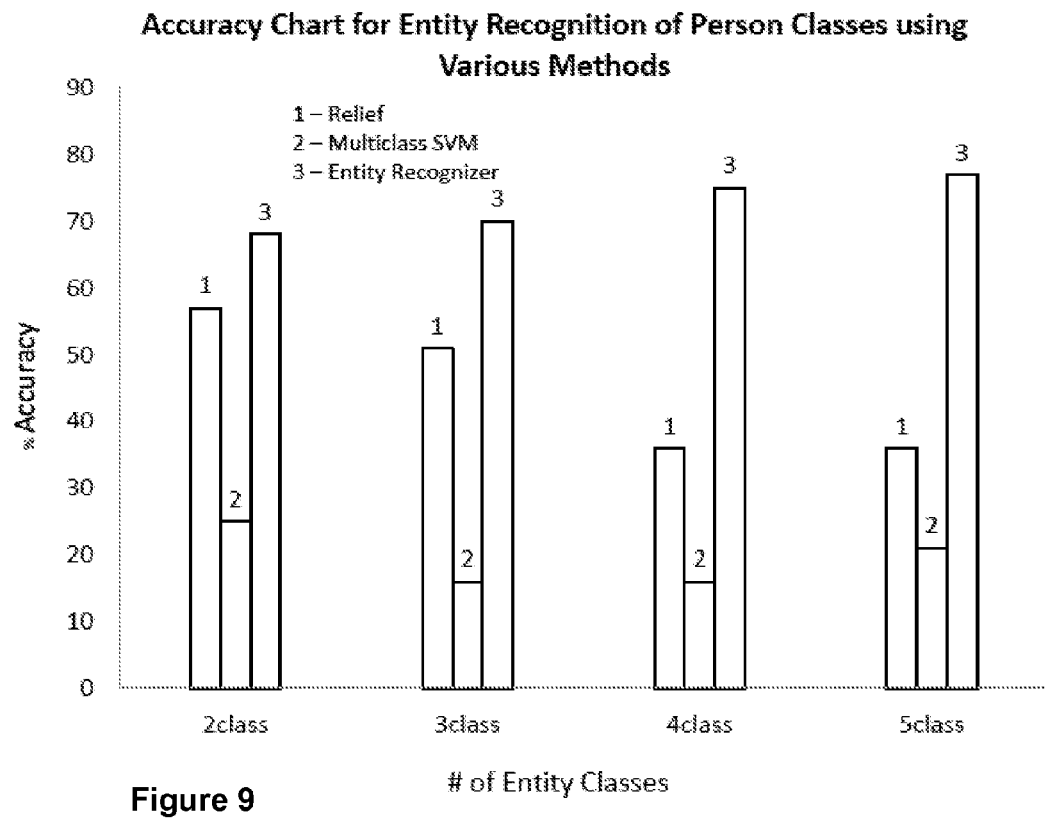
FIG. 9 compares the accuracy of the present Entity Recognizer to Feature Selection using Relief and Classification using Multiclass SVM, using subsets of 2 to 5 person entity classes.

The classification accuracy of the two methods was then compared with that of the entity recognizer described herein using a subset of the classes from the food domain. FIG. 8 shows the accuracy of the three methods using subsets of 2 to 5 food entity classes. The classification accuracy of the two methods was also compared with that of the entity recognizer described herein using a subset of the classes from the person domain. FIG. 9 shows the accuracy of the three methods using subsets of 2 to 5 person entity classes.

The results show that while Multiclass SVM is more accurate than Relief, the entity recognizer described herein is much more accurate than the other methods, with accuracy ranging from 70% to 97%. These results also confirm theoretical observations about the limitations of feature selection and document classification methods when applied in the context of entity recognition.

Accuracy Analysis

Accuracy analysis for the entity recognizer system was conducted in two phases. For both phases five food entity classes were selected, namely, fruit, vegetable, meat, dessert and entree, five person entity classes, namely, sports person, politician, entertainer, spiritual leader and business person, six electronics entity classes, namely, digital camera, dvd player, cellphone, printer, laptop and pda. For each entity class, a set of ten (10) seed entities was provided as training data. The training data was used to construct the entity models for each entity class using the techniques described herein.

Figure 10:
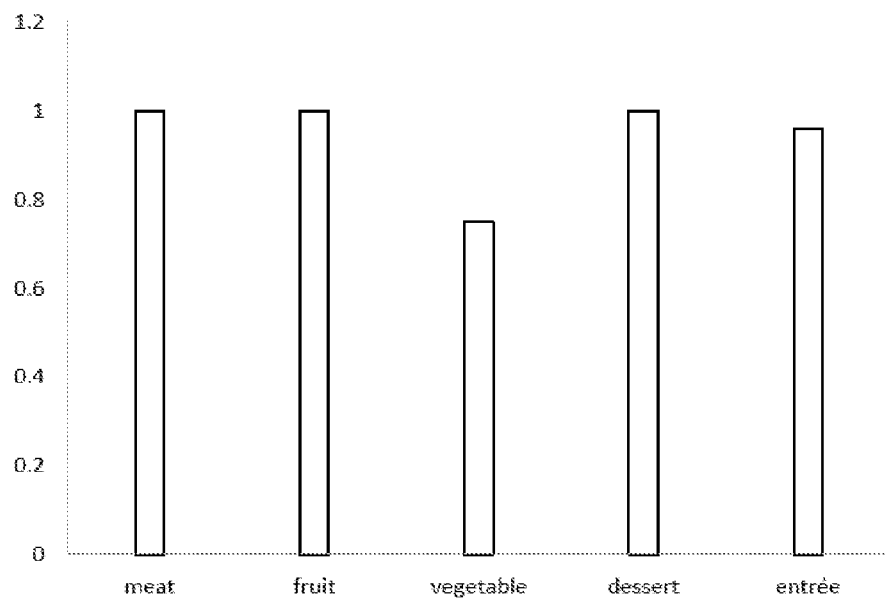
FIGS. 10, 11 and 12 illustrate the accuracy with which entities from the person, food and electronics test sets were recognized by the entity recognizer.
Figure 11:
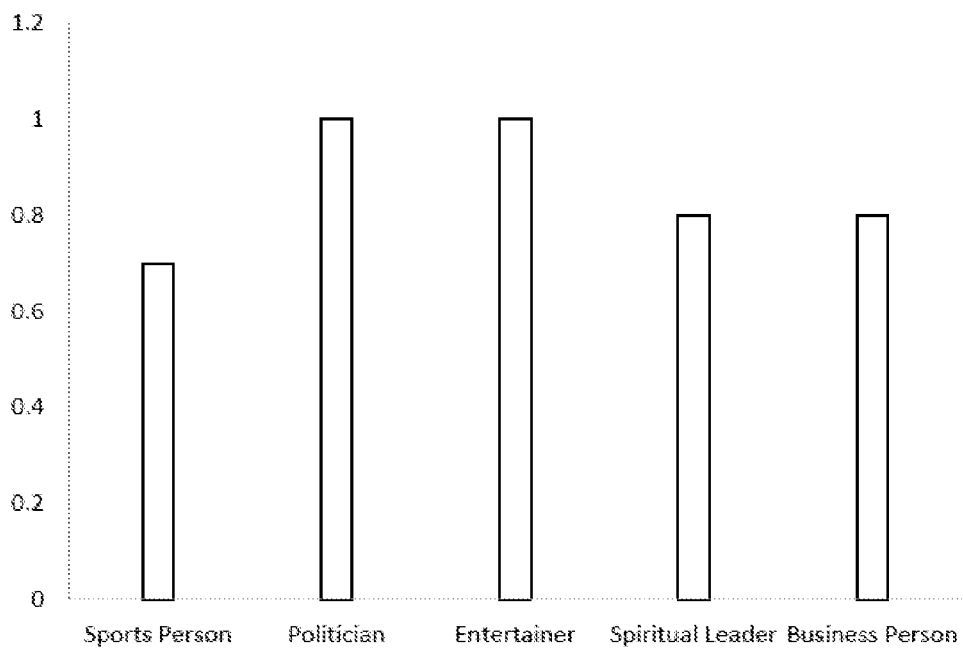
Figure 12:
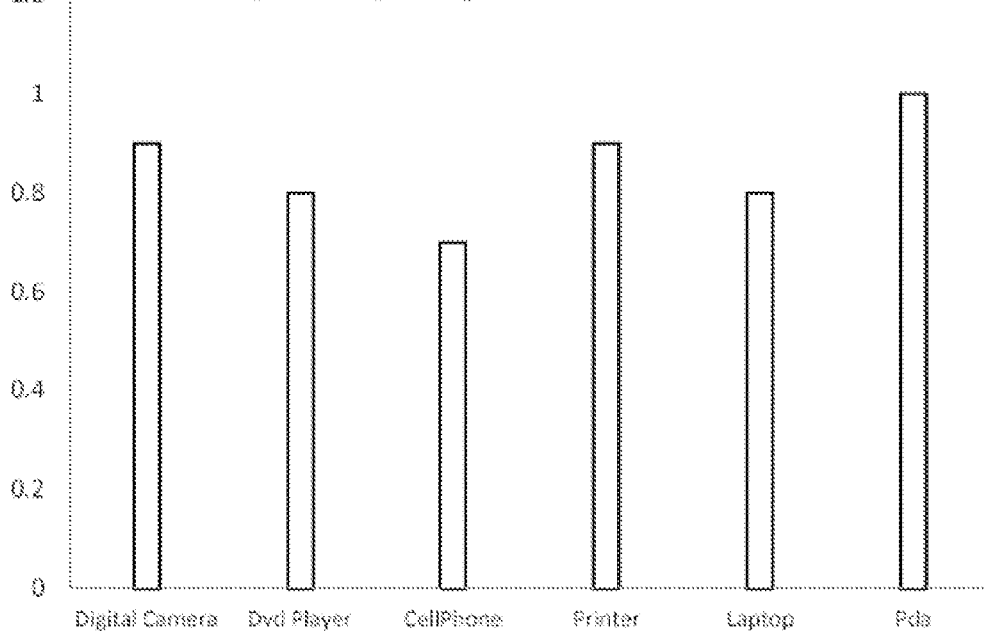

In the first phase, an accuracy analysis using a test set consisting of 200 food entities, 150 person entities and 250 electronics entities was conducted. FIGS. 10, 11 and 12 show the accuracy with which entities from the three test sets were recognized by the entity recognizer.

Figure 13:
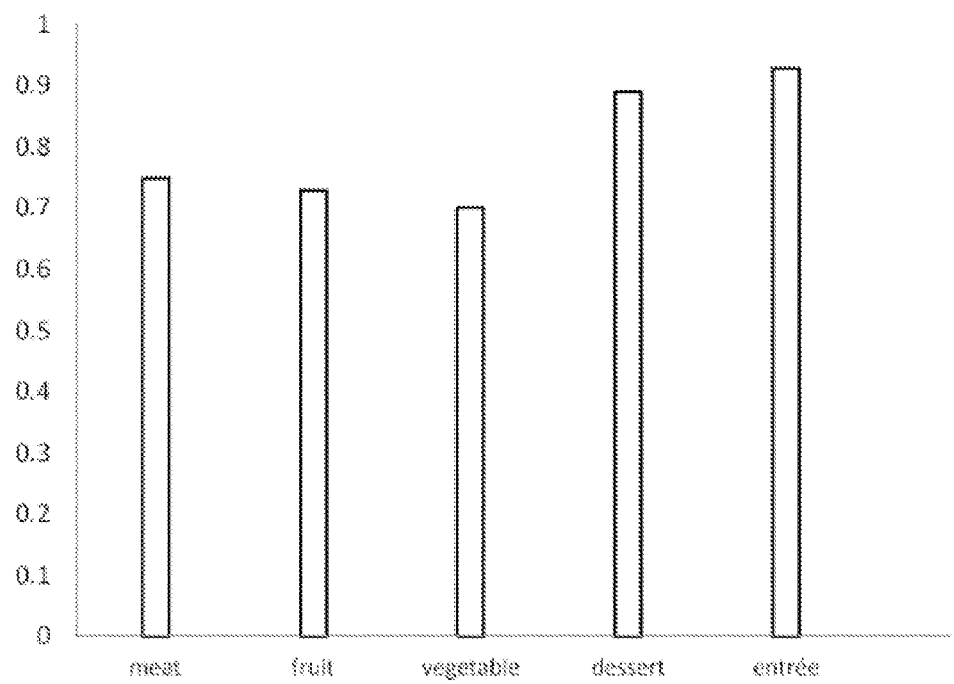
FIGS. 13, 14 and 15 illustrate the precision with which entities from the queries were recognized by the entity recognizer.
Figure 14:
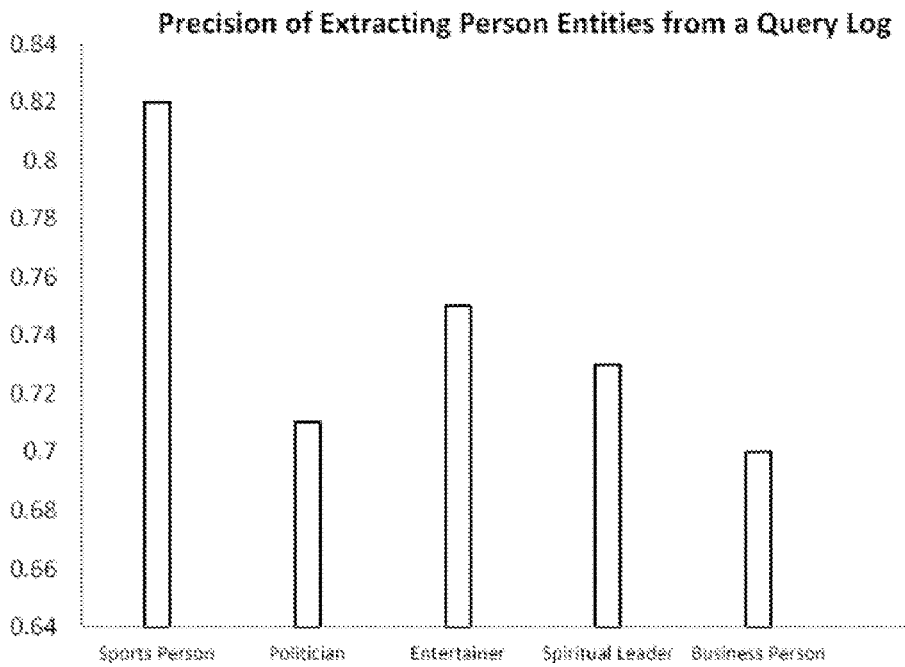
Figure 15:
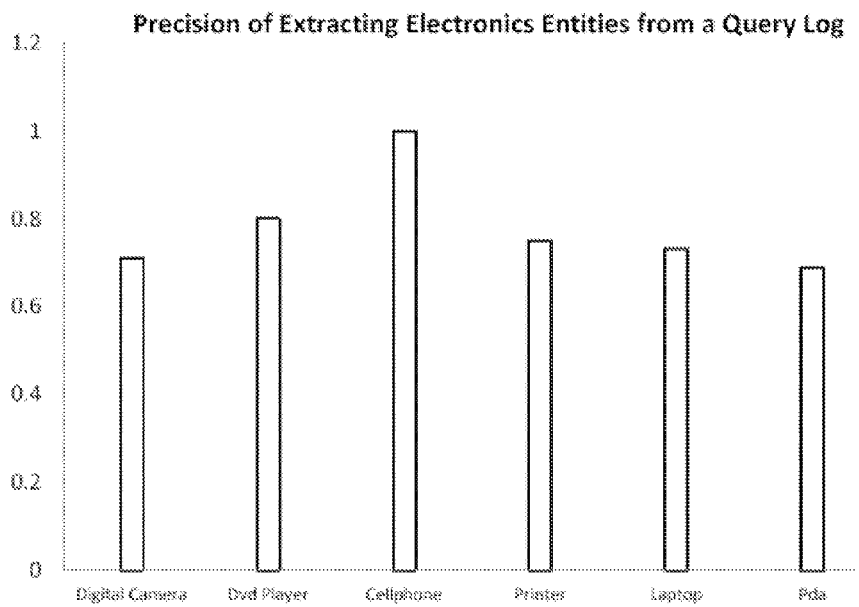

In the second phase, to produce a realistic evaluation of the quality of the entities recognized by the entity recognition system, a portion of a commercial search engine query log was used. The query log file was extracted from two sets of search engine queries provided by MSN and AOL that collectively represent around 15 million queries. In this phase, precision analysis was conducted by observing the accuracy of the entities recognized for the specified fine-grained entity classes in a set of eight-million queries using the entity recognizer. FIGS. 13, 14 and 15 show the precision with which entities from the queries were recognized by the entity recognizer.

Figure 16:
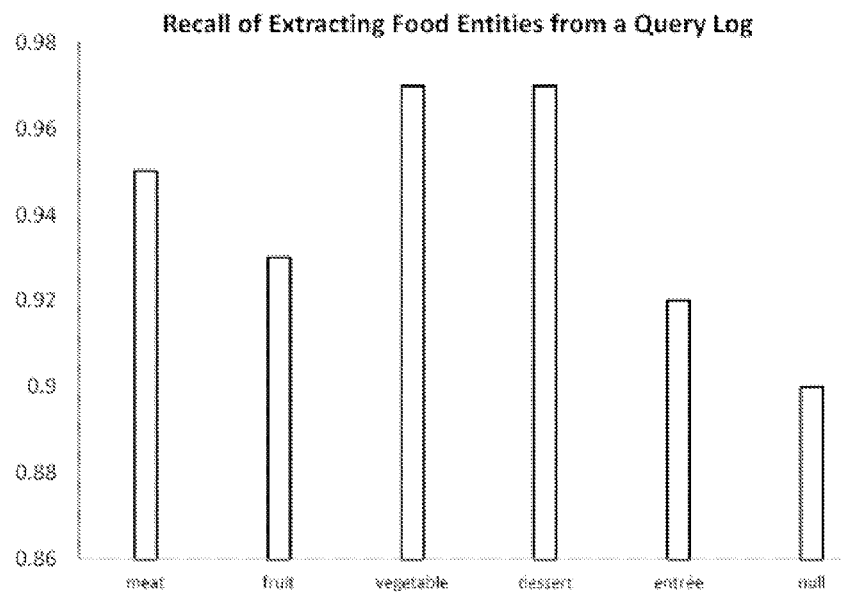
FIGS. 16, 17 and 18 illustrate the recall with which entities from the queries were recognized by the entity recognizer.
Figure 17:
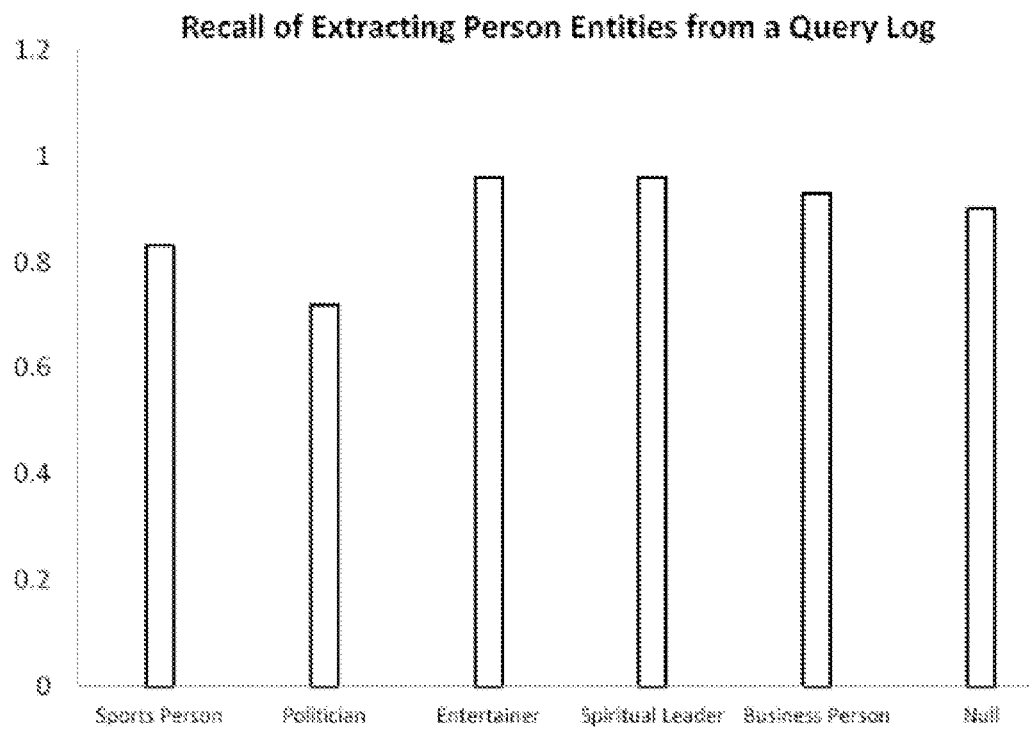
Figure 18:
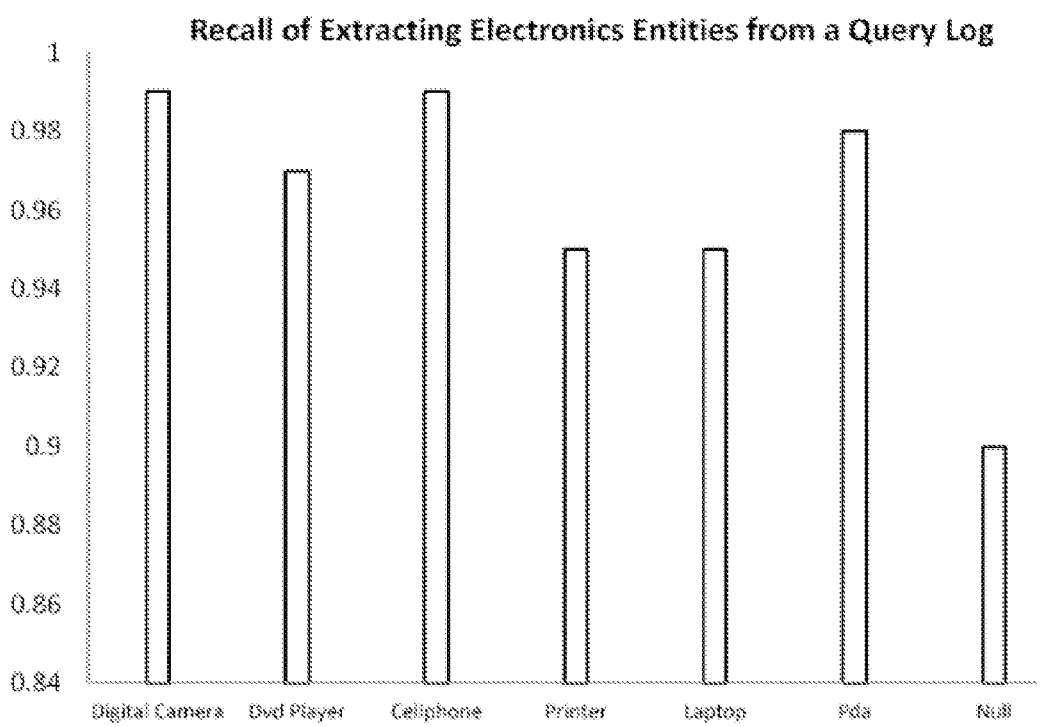
Figure 22A:
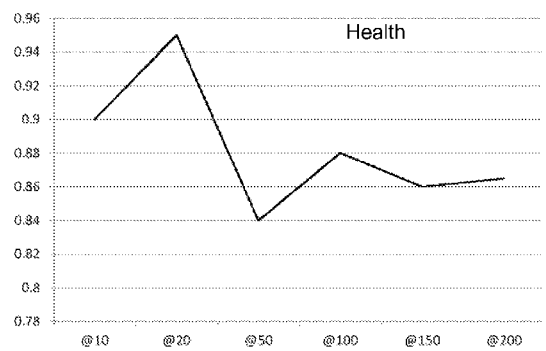
FIGS. 22a-h illustrate overall results of the precision analysis for broad entity classes.
Figure 22B:
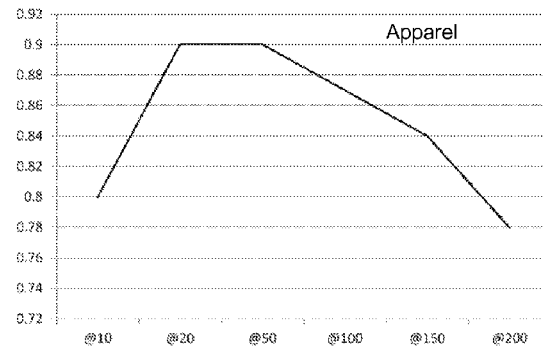
Figure 22C:
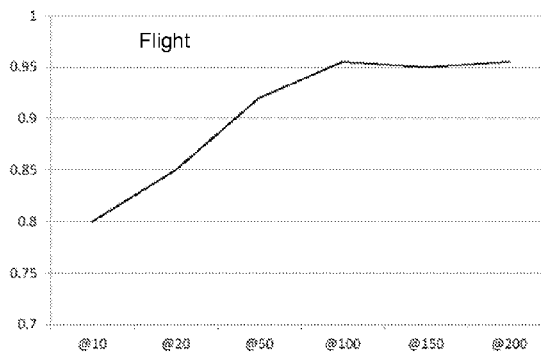
Figure 22D:
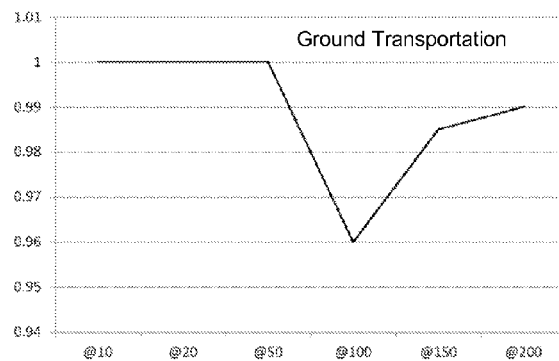
Figure 22E:
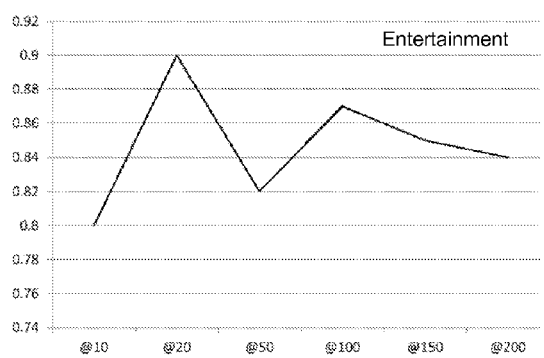
Figure 22F:
Figure 22G:
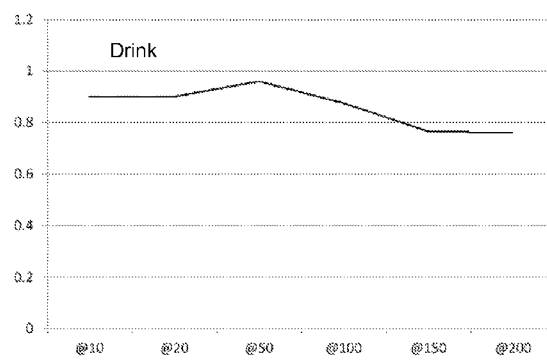
Figure 22H:
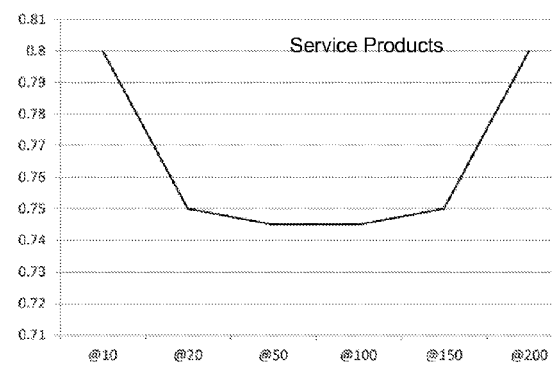

In addition to precision analysis, recall analysis was conducted by observing the accuracy of the entities recognized in a set of 200 queries constructed for each entity class. This set of 200 queries was called the recall set and comprised of queries containing entity instances belonging to each fine grained entity class. In addition to the recall sets for each entity class, a recall set was also created for the null class. The queries in the recall set for the null class did not contain entity instances belonging to any of the predefined entity classes. FIGS. 16, 17 and 18 show the recall with which entities from the queries were recognized by the entity recognizer.

FIG. 19 shows some of the fine-grained entities extracted from the query log by the entity recognizer for the food classes. FIGS. 20 and 21 show some of the fine grained entities extracted for the person and electronics classes respectively.

In addition to accuracy analysis on search engine queries, precision analysis was performed on the query log. For this analysis eight broad entity classes were selected, namely, apparel, food, drink, health, ground transportation, flights, entertainment and product and services. The selection of these classes was made based on their importance to areas such as advertising, health, business analysis and web search. For each class, a set of ten (10) seed entities were provided as training data and the entities for the domain specific entity classes were identified in the set of two-million queries using the entity recognizer.

The calculation of the precision for entities in each entity class was done through human-evaluation: for each of the selected classes, the top k (k=10, 20, 50, 100, 150, 200) entities were selected by sorting the entities in descending order based on their scores. An evaluator manually assessed the relevance of the top k entities with respect to the selected entity class and the precision at top k for the entities was calculated based on the following formula:

$$\text{precision}=(\text{number of relevant entities})/k$$

The results of the precision analysis are shown in FIGS. 22a-h in which precision is shown on the y-axis and 'topic' is shown on the x-axis. The results show good precision for the recognized entities. The top twenty entities for most classes have precision close to 90% and the precision for top 200 entities for all the entity classes is between 76-90%. It was also noted that this technique is able to classify misspelled entities (e.g., the food entity casserole has the following spelling variations: caserol, casarol, cassarolle, cassorol, cassaroll, cassoral, casorole, cassorle) and is able to recognize these entities in spite of all their spelling variations.

Conclusion

This disclosure has described a system and method for the analysis of online search queries. To wit, this is the only query analysis system that performs a highly focused domain specific analysis of queries. Given a set of entity classes defined by the user through training examples, the system identifies entities that belong to the given classes in the search engine queries.

Recognition of class specific information in search queries can benefit a large number of search engines and web vendors, since they can use this information to improve their search results, provide targeted advertising, extract domain specific information from query logs, and improve query expansion techniques.

The experimental results show that the proposed techniques achieve good accuracy in the extraction of entities.

Search engines can benefit from entity recognition in queries by providing improved search results and better targeted advertising. Once search engines recognize entities in the queries submitted by users, they can display search results that are relevant to the entities. For example, a query for a digital camera such as "kodak c310" can result in web pages that are organized in groups so that the first group provides reviews for the camera, the second group compares this camera with other cameras, the third group offers deals for camera sales and so on. Moreover, recognizing entity classes for multiclass entities (e.g., apple is a multiclass entity since it is both a fruit and a technology company) can greatly help search engines in organizing search results by groups based on the various classes to which the entity belongs.

Currently, search engines display advertisements based on the presence of specific keywords in queries. Collecting keywords specific to an advertisement is inefficient, labor intensive and often results in inaccurate advertisements. Once the entities in a query are recognized, search engines can show advertisements based on the presence of specific entities in queries. As a result, advertisement providers can specify entity classes for which they will support advertisements instead of supplying keywords. For example, an advertiser selling specific kinds of flowers can specify the "bulbs" and "perennials" entity classes or an advertiser selling specific kinds of books can specify the "science fiction books" and "math books" entity classes. Entity based advertising will save the manual labor involved in collecting (potentially infinite) keywords related to advertisements.

Entity based advertising can also enable the search engine to display a larger selection of advertisements sorted by relevance. For example entity recognition on the query apple pie recipe will enable the search engine to display advertisements for all vendors that sell fruit desserts instead of only showing advertisements for vendors that sell apple pie. This is based on the intuition that many times users searching for apple pie can end up buying a pineapple cake instead. A larger selection of advertisements can also help search engines in improving their click through rates.

Entity recognition in query logs can provide search engines with valuable information that can help them attract advertisers. For example if a search engine can analyze its query logs to show that it received a large number of queries containing Chinese food entities, it can then attract many Chinese restaurants to advertise on its site. Also entity analysis in query logs will empower search engines with business intelligence that they can share with their advertisers, which in turn can help advertisers improve their products and marketing strategies.

Query expansion techniques are currently at a rudimentary stage since they are based primarily on keyword matching against query logs. For example, "data mining" and "cultural computing" are queries that should produce similar expansions since they both represent areas of study in computer science. However, most search engines do not support this since their query expansion techniques are not based on matching entities in the searched query to same class entities in their query logs.

Web vendors can also benefit from entity recognition due to improved search results and entity recognition in query logs.

Web vendors can use entity recognition on their search queries to display products in the same category as the entity searched. This is particularly beneficial if the web store does not have a product or has very few products that match a user's query. For example, if a user searches for "caigua" products and the web store has very few caigua products, the web store might use the fact that caigua is a vine to display products for other vines such as products for bitter melon, cucumber and squash.

Web vendors can use entity recognition in their query logs to estimate the popularity of products queried by their users. This can help them add more products in the most popular categories thereby increasing sales. Web vendors can also extract statistical information for entity classes from query logs to create the most profitable advertisements and marketing strategies. Although the technology described herein was designed for the recognition of entities in search queries, it can also be used for the domain specific classification of documents. Document classification has various uses including spam detection, improved search results and content based advertising.

As will be appreciated by one of skill in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-readable storage medium having computer-usable program code embodied in the medium.

Any suitable computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

To the extent that the present invention is described with reference to flowchart illustrations and/or block diagrams of methods, apparatus (systems) and computer program products according to embodiments of the invention, it will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Any prompts associated with the present invention may be presented and responded to via a graphical user interface (GUI) presented on the display of a computer, portable computer, mobile communications device or the like. Prompts may also be audible, vibrating, etc.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

The invention claimed is:

1. A computer implemented method of discerning an entity class from a search query comprising:
   receiving a search query;
   breaking the search query into query fragments comprised of terms using stop words in the query as delimiters between the query fragments;
   comparing the terms of the query fragments to terms belonging to one or more bag of words models;
   removing the terms of the query fragments that match terms belonging to the one or more bag of words models;
   remembering the bag of words models to which the terms removed from the query fragments belong;
   processing the remaining n terms of the query fragments using a sliding window approach to obtain query phrases containing 1-n grams from the fragments;
   submitting each of the query phrases to a search engine;
   obtaining search results;
   extracting and storing a sampling of snippets from the search results for each query phrase;
   stemming non stop words from the stored sampling of snippets for each query phrase;
   computing a similarity score for the stemmed non stop words from the stored sampling of snippets with respect to each entity class bag of words model;
   selecting snippet entity classes based on the bag of words models having the highest similarity score with the stemmed non stop words from the stored sampling of snippets;
   consolidating the selected snippet entity classes by adding the similarity scores of snippet entity classes that are the same such that there are no duplicate snippet entity classes;
   identifying a candidate list of entity classes to which the query phrase belongs based on the similarity scores for the consolidated snippet entity classes;
   selecting the entity classes with similarity scores that exceed a predetermined threshold as the entity classes to which the query phrase belongs; and
   using the remembered bag of words models to which the terms removed from the query fragments belong to choose context sensitive entity classes to which the query phrase belongs.

2. The method of claim 1 wherein a bag of words model for an entity class is created by:
   supplying an entity class name and a plurality of instances belonging to the entity class;
   submitting each instance to a search engine;
   extracting and storing a plurality of html documents from the search results for each instance;
   converting each html document to a text document;
   extracting well formed sentences from the text documents;
   stemming non stop words in the well formed sentences;
   constructing an entity network for the entity class comprised of the entity class name, the plurality of instances and stemmed non stop words obtained from well formed sentences containing words in the entity network;
   assigning a likelihood score to each word in the entity network based on the frequency with which that word appeared in the well formed sentences;
   creating the bag of words model for the entity class using the words in the entity network along with their respective likelihood scores; and
   refining the bag of words models for the entity classes by (i) reducing likelihood scores of words shared by bag of words models of various entity classes and (ii) removing proper nouns from the models.

3. The method of claim 2 wherein the extracted and stored sampling of snippets from the search results for each query phrase does not exceed one hundred snippets.

4. The method of claim 2 wherein the extracted and stored sampling of snippets from the search results for each query phrase does not exceed ten snippets.

5. The method of claim 2 wherein the plurality of instances belonging to the entity class is no more than one hundred.

6. The method of claim 2 wherein the plurality of html documents is no more than one hundred.

7. The method of claim 2 wherein the plurality of instances belonging to the entity class is no more than ten.

8. The method of claim 2 wherein the plurality of html documents is no more than ten.

9. The method of claim 2 wherein the bag of words models are stored in an inverted index.

10. A system for discerning an entity class from a search query comprising:
   a computer device coupled to a search engine via a network connection and executing an entity recognition application that:
   receives a search query;
   breaks the search query into query fragments comprised of terms using stop words in the query as delimiters between the query fragments;
   compares the terms of the query fragments to terms belonging to one or more bag of words models accessible to the entity recognition application;
   removes the terms of the query fragments that match terms belonging to the one or more bag of words models;
   remembers the bag of words models to which the terms removed from the query fragments belong;
   processes the remaining n terms of the query fragments using a sliding window approach to obtain query phrases containing 1-n grams from the fragments;
   submits each of the query phrases to the search engine;
   obtains search results;
   extracts and stores a sampling of snippets from the search results for each query phrase;
   stems non stop words from the stored sampling of snippets for each query phrase;
   calculates a similarity score for the stemmed non stop words from the stored sampling of snippets with respect to each entity class bag of words model;
   selects snippet entity classes based on the bag of words models having the highest similarity score with the stemmed non stop words from the stored sampling of snippets;
   consolidates the selected snippet entity classes by adding the similarity scores of snippet entity classes that are the same such that there are no duplicate snippet entity classes;
   identifies a candidate list of entity classes to which the query phrase belongs based on the similarity scores for the consolidated snippet entity classes;
   selects the entity classes with similarity scores that exceed a predetermined threshold as the entity classes to which the query phrase belongs; and
   uses the remembered bag of words models to which the terms removed from the query fragments belong to choose context sensitive entity classes to which the query phrase belongs.

11. The system of claim 10 wherein a bag of words model for an entity class is created by:
   supplying an entity class name and a plurality of instances belonging to the entity class;
   submitting each instance to a search engine;
   extracting and storing a plurality of html documents from the search results for each instance;
   converting each html document to a text document;
   extracting well formed sentences from the text documents;
   stemming non stop words in the well formed sentences;
   constructing an entity network for the entity class comprised of an entity class name, the plurality of instances, and stemmed non stop words obtained from well formed sentences containing words in the entity network;
   assigning a likelihood score to each word in the entity network based on the frequency with which that word appeared in the well formed sentences;
   creating the bag of words model for the entity class using the words in the entity network along with their respective likelihood scores; and
   refining the bag of words models for the entity classes by reducing likelihood scores of words shared by bag of words models of various entity classes and by removing proper nouns from the models.

12. The system of claim 11 wherein the extracted and stored sampling of snippets from the search results for each query phrase does not exceed one hundred snippets.

13. The system of claim 11 wherein the extracted and stored sampling of snippets from the search results for each query phrase does not exceed ten snippets.

14. The system of claim 11 wherein the plurality of instances belonging to the entity class is no more than one hundred.

15. The system of claim 11 wherein the plurality of html documents is no more than one hundred.

16. The system of claim 11 wherein the plurality of instances belonging to the entity class is no more than ten.

17. The system of claim 11 wherein the plurality of html documents is no more than ten.

18. The system of claim 11 wherein the bag of words models are stored in an inverted index.

* * * * *